Patented Dec. 1, 1936

2,062,403

UNITED STATES PATENT OFFICE 2,062,403

CELLULOSIC COMPOSITION

Henry Dreyfus, London, England

No Drawing. Application September 3, 1932, Serial No. 631,737. In Great Britain October 13, 1931

5 Claims. (Cl. 106—40)

This invention relates to the production of solutions, compositions and articles having a basis of cellulose acetate or other organic esters or ethers of cellulose.

I have found that halogen substituted cyclic dicarboxylic acids, their anhydrides and their esters are highly useful high boiling solvents or plasticizers for cellulose acetate and other organic derivatives of cellulose and also possess other valuable properties in compositions containing the cellulose derivatives.

The present invention comprises solutions, compositions and articles containing halogen substituted cyclic dicarboxylic acids, their anhydrides and their esters and organic derivatives of cellulose such, for example, as cellulose acetate, propionate, or butyrate or methyl, ethyl or benzyl cellulose. Halogen substituted phthalic and naphthenic acids and their anhydrides and homologues and substitution products of these bodies, and in particular the chlorine substituted, bromine substituted and chlorine and bromine substituted phthalic acids, their anhydrides and their mono- and di-esters, e. g. methyl, ethyl, amyl, cetyl and benzyl esters are especially useful substances.

The following are specific examples of bodies which may be employed.

4 chlorphthalic acid, its anhydride and its di-methyl and diethyl esters.

3.6 dichlorphthalic acid, its anhydride and its mono- and di-ethyl esters.

4.5 dichlorphthalic acid, its anhydride and its mono- and di-ethyl esters.

Tetrachlorphthalic acid, its anhydride and its mono- and di-methyl, ethyl, amyl, cetyl and benzyl esters.

4.5-dibromphthalic acid, its anhydride and its mono- and di-methyl and ethyl esters.

Tetrabromphthalic acid, its anhydride and its mono-methyl ester.

The mono- and di-methyl esters of 3.5.6 tri-brom-4-hydroxyphthalic acid.

3'-chlor-benzophenone-2-4'-dicarboxylic acid.

Cinnamic acid dibromide-o- and p-carboxylic acids.

In the production of the solutions, compositions and articles having a basis of cellulose acetate or other organic derivatives of cellulose the halogen substituted cyclic dicarboxylic acids, anhydrides, esters or mixtures thereof may be employed either alone or together with other high boiling solvents or plasticizers such, for instance, as aryl sulphonamides. Moreover, such other substances as may be necessary or desirable, for instance artificial resins, natural resins, fillers, fire retardants, e. g. aryl phosphates, gypsum, calcium tartrate and the like may be incorporated into the solutions, compositions, and articles. In this connection it is to be noted that as the substances of the invention and especially the poly-halogenated cyclic dicarboxylic acids and their anhydrides possess excellent fire retardant properties very satisfactory uninflammable or low flammable compositions can be produced even without the aid of aryl phosphates or other addition fire retarders. Whilst the substances of the invention are, under the conditions usually obtaining in the manufacture and working up of solutions, compositions and articles containing organic derivates of cellulose, stable compounds, in such cases as it is considered desirable bodies, e. g. dicyandiamide which will absorb any liberated halogen may be incorporated into the solutions, compositions or articles.

The substances of the invention may be employed in any desired manner. For instance, they may be employed in conjunction with low boiling solvents (or mixtures of low boiling solvents) such for example as acetone, methyl acetate, ethyl alcohol and ethyl acetate, methyl formate, or acetaldehyde in the production of solutions of cellulose acetate or other organic derivatives of cellulose for use in the manufacture of artificial filaments or films, dopes, varnishes, lacquers, adhesives or the like. Further, for instance, they may be employed in the manufacture of plastic masses, moulding powders and the like by incorporation into such products at any stage in the manufacture thereof.

The above mentioned methods of employment of the halogen substituted aromatic dicarboxylic acids, their anhydrides and esters are given solely by way of example, the invention including within its scope the employment of these bodies at any stage in the manufacture of solutions, compositions or articles having a basis of organic derivatives of cellulose for the purpose of effecting a plasticizing or softening action upon the organic derivatives of cellulose.

In the expression "a halogenated nuclear substituted cyclic dicarboxylic compound", as used hereinafter in the claims, the phrase "dicarboxylic compound" is intended to denote a dicarboxylic acid, or the anhydride or a monohydric alcohol ester of a dicarboxylic acid.

The following examples illustrate the invention, but it is to be understood that the invention is not limited to particular bodies or proportions mentioned in the examples.

Example 1

The following composition may be employed for the production of plastic masses:—

| | Parts |
|---|---|
| Acetone-soluble cellulose acetate | 100 |
| 3.5-dichlorphthalic acid diethyl ester | 15 |
| Xylene mono-methyl sulphonamide | 35 |
| Benzene | 50 |
| Alcohol | 50 |

Conveniently the cellulose acetate is sprayed with a mixture of the other ingredients and thereafter the whole worked up by means of kneaders and then malaxating rollers after which the product is pressed, sliced, seasoned and finished as desired.

Example 2

A lacquer may be made up according to the following formula:—

| | Parts |
|---|---|
| Acetone-soluble cellulose acetate | 20 |
| 4.5-dibromphthalic acid diethyl ester | 10 |
| Synthetic resin (diphenylol-propane-formaldehyde or phenol-formaldehyde type) | 25 |
| Acetone | 100 |
| Benzene | 40 |
| Alcohol | 20 |
| Diacetone alcohol | 30 |

Example 3

Artificial filaments are spun by the dry spinning process from a solution consisting of:—

| | Parts |
|---|---|
| Acetone-soluble cellulose acetate | 100 |
| 4 chlorphthalic acid diethyl ester | 8 |
| Acetone | 300 |

What I claim and desire to secure by Letters Patent is:—

1. A composition of matter comprising an organic substitution derivative of cellulose, and a halogen nuclear substituted phthalic acid esterified solely with an alcohol selected from the group consisting of methyl, ethyl, amyl, cetyl and benzyl alcohols.

2. A composition of matter comprising cellulose acetate, and a halogen nuclear substituted phthalic acid esterified solely with an alcohol selected from the group consisting of methyl, ethyl, amyl, cetyl and benzyl alcohols.

3. A composition of matter comprising cellulose acetate and 3.5-dichlorphthalic diethyl ester.

4. A composition of matter comprising cellulose acetate and 4.5-dichlorphthalic acid diethyl ester.

5. A composition of matter comprising cellulose acetate and 4 chlorphthalic acid diethyl ester.

HENRY DREYFUS.